United States Patent
Shin et al.

(10) Patent No.: US 9,939,691 B2
(45) Date of Patent: Apr. 10, 2018

(54) LIQUID CRYSTAL DISPLAY DEVICE

(71) Applicant: Samsung Display Co., Ltd., Yongin-si, Gyeonggi-Do (KR)

(72) Inventors: Cheol Shin, Hwaseong-si (KR); Hak Sun Chang, Yongin-si (KR); Ka Eun Kim, Yongin-si (KR); Se Hyun Lee, Seoul (KR); Ki Chul Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 245 days.

(21) Appl. No.: 14/881,494

(22) Filed: Oct. 13, 2015

(65) Prior Publication Data

US 2016/0116806 A1 Apr. 28, 2016

(30) Foreign Application Priority Data

Oct. 28, 2014 (KR) ........................ 10-2014-0147448

(51) Int. Cl.
*G02F 1/1343* (2006.01)
*G02F 1/1362* (2006.01)

(52) U.S. Cl.
CPC .. *G02F 1/134309* (2013.01); *G02F 1/136286* (2013.01); *G02F 2001/134345* (2013.01)

(58) Field of Classification Search
CPC ............................................... G02F 1/134309
USPC ....................................................... 349/141
See application file for complete search history.

(56) References Cited

U.S. PATENT DOCUMENTS

| 6,140,980 A * | 10/2000 | Spitzer | A61B 3/113 |
| | | | 257/E21.614 |
| 2009/0244425 A1 * | 10/2009 | Jung | G02F 1/133753 |
| | | | 349/48 |
| 2014/0043571 A1 | 2/2014 | Chang et al. | |

FOREIGN PATENT DOCUMENTS

| KR | 1020090116856 A | 11/2009 |
| KR | 1020120017351 A | 2/2012 |
| KR | 1020150005000 A | 1/2015 |

* cited by examiner

*Primary Examiner* — Lucy Chien
(74) *Attorney, Agent, or Firm* — H.C. Park & Associates, PLC

(57) ABSTRACT

A liquid crystal display according to an exemplary embodiment of the present invention includes: a first substrate; a gate line formed on the first substrate; an insulating layer formed on the gate line; and a first subpixel electrode and a second subpixel electrode that are formed on the insulating layer. Each of the first subpixel electrode and the second, subpixel electrode includes a first subregion and a second subregion. At least one of the first subregion and the second subregion includes a vertical stem, a horizontal stem extending from a middle of the vertical stem, and a plurality of minute branches laterally extending in a diagonal direction from the horizontal stem. The plurality of minute branches laterally extending from the horizontal stem are alternately branched with reference to the horizontal stem.

18 Claims, 20 Drawing Sheets

LIQUID CRYSTAL DISPLAY DEVICE

CROSS-REFERENCE TO RELATED APPLICATION

This application claims priority to and the benefit of Korean Patent Application No. 10-2014-0147448 filed in the Korean Intellectual Property Office on Oct. 28, 2014, the entire contents of which are incorporated herein by reference.

BACKGROUND OF THE INVENTION

Field of the Invention

The present invention relates to a liquid crystal display device.

Description of the Related Art

A liquid crystal display device, which is one of the most common types of flat panel displays currently in use, includes two display panels with field generating electrodes such as a pixel electrode, a common electrode, and the like, and a liquid crystal layer interposed therebetween. The liquid crystal display generates an electric field in the liquid crystal layer by applying a voltage to the field generating electrodes, determines alignment of liquid crystal molecules of the liquid crystal layer through, the generated electric field, and controls polarization of incident light, thereby displaying images.

As the liquid crystal display has been used as a display device of a television receiver, a size of the screen has been increased. As such, as the size of the liquid crystal display is increased, there is a problem in that a viewing difference between a case where a viewer views a center of the screen and a case where the viewer views left and right ends of the screen is increased.

In order to compensate for the viewing difference, the display device is carved in a concave shape or a convex shape. The display device may be provided as a portrait type having a longer vertical length than a horizontal length and bent in a vertical direction based, on the viewer, and may be provided as a landscape type having a shorter vertical length than a horizontal length and bent in a horizontal direction based on the viewer.

However, in the case of forming a liquid crystal display with a carved shape by bending the liquid crystal display, a front end stress is applied to a substrate positioned to be inward of a curved surface between two substrates. Thus, a texture may be generated due to misalignment of upper and lower substrates.

The above information disclosed in this Background section is only for enhancement of understanding of the background of the invention and therefore it may contain information that does not form the prior mi that is already known, in this country to a person of ordinary skill in the art.

SUMMARY OF THE INVENTION

The present invention has been made in an effort to provide a liquid crystal display of which misalignment is reduced even through the liquid crystal display is bent by appropriately deforming the shape of a pixel, electrode.

In addition, the present invention provides a liquid crystal display that can solve a problem of generation, of a texture in an interface of pixel electrodes by shape deformation, of the pixel electrode.

A liquid crystal display according to an exemplary embodiment of the present invention includes: a first substrate; a gate line formed on the first substrate; an insulating layer formed on the gate line; and a first subpixel electrode and a second subpixel electrode. Each of the first subpixel electrode and the second subpixel electrode includes a first subregion and a second subregion. At least one of the first subregion and the second, subregion includes a vertical stem, a horizontal stent extending from a middle of the vertical stem, and a plurality of minute branches laterally extending in a diagonal direction from, the horizontal stem. The plurality of minute branches laterally extending from the horizontal stem are alternately branched with reference to the horizontal stem.

A vertical stem of the first subregion and a vertical stem of the second subregion of the first subpixel electrode may be respectively formed at left and right edges in one pixel, and a vertical stem of the first subregion and a vertical stem of the second subregion of the second subpixel electrode may be respectively formed at left and right edges in one pixel.

Tire width of one end of the horizontal stem that is adjacent to the vertical stem of the pixel, electrode may be wider than, the width of the opposite end of the horizontal stem, which is not adjacent to the vertical stem.

The width of the horizontal stem may be gradually decreased farther away from the vertical stem and thus may be an oblique inclination.

An interface of the first subregion and the second subregion may be obliquely formed.

The length of the plurality of minute branches extending in a first direction from the horizontal stem of the first subregion may become the longest near the vertical stem of the first subregion and may be shortened as proceeding away from the vertical stem.

The length of the plurality of minute branches extending in a second direction from the horizontal stem of the second subregion may become the longest near the vertical stem of the second subregion and may be shortened as proceeding away from the vertical stem.

A liquid crystal display according to an exemplary embodiment of the present invention includes: a first substrate; a gate line formed on the first substrate; an insulating layer formed on the gate line; and a first subpixel electrode and a second subpixel electrode. Each of the first subpixel electrode and the second subpixel electrode includes a first subregion and a second subregion. At least one of the first subregion and the second subregion includes a vertical stem, a horizontal stem extending from a middle of the vertical stem, and a plurality of minute branches laterally extending in a diagonal direction from the horizontal stem. A minute branch of the plurality of minute branches, which is the farthest from the vertical stem, is bent in a direction of the horizontal stem while forming a constant angle.

A vertical stem of the first subregion and a vertical stem of the second subregion of the first subpixel electrode may be respectively formed at left and right edges in one pixel and a vertical stem of the first subregion and a vertical stem of the second subregion of the second subpixel electrode may be respectively formed at left and right edges in one pixel.

The constant angle may imply an angle between an extension direction of the plurality of minute branches and the bent minute branch, and the angle may be between 0 degree to 45 degrees.

A structure in which a minute branch is bent with a constant angle may exist in one or more regions of the first subregion and the second subregion in the second subpixel area.

The minute branches laterally extending from the horizontal stem may be alternately branched with reference to the horizontal stem.

A branch point of each of the minute branches laterally extending from the horizontal stem may be formed in the same location.

A liquid crystal display according to another exemplary embodiment of the present invention includes: a first substrate; a gate line formed on the first substrate; an insulating layer formed on the gate line; and a first subpixel electrode and a second subpixel electrode formed on the insulating layer. Each of the first subpixel electrode and the second subpixel electrode includes a first subregion and a second subregion. At least one of the first subregion and the second subregion includes a vertical stem, a horizontal stem extending from a middle of the vertical stem, and a plurality of minute branches laterally extending in a diagonal direction from the horizontal stem. A protrusion structure is formed at an end of each of the plurality of minute branches.

The protrusion structure may be formed in the shape of a triangle.

The minute branches laterally extending from the horizontal stem may be alternately branched with reference to the horizontal stem.

A branch point of each of the minute branches laterally extending from the horizontal stem may be formed in the same location.

A vertical stem of the first subregion and a vertical stem of the second subregion of the first subpixel electrode may be respectively formed at left and right edges in one pixel, and a vertical stem of the first subregion and a vertical stem of the second subregion of the second subpixel electrode may be respectively formed at left and right edges in one pixel.

The liquid crystal display may be a carved-type liquid crystal display.

The liquid crystal display may be a carved-type liquid crystal display.

As described, according to the exemplary embodiments of the present invention, misalignment can be reduced even through the liquid crystal display is bent, in addition, a liquid crystal control force can be increased through the shape deformation of the pixel electrode and accordingly generation of a texture can be suppressed.

DETAILED DESCRIPTION OF THE EMBODIMENTS

Figure 1:
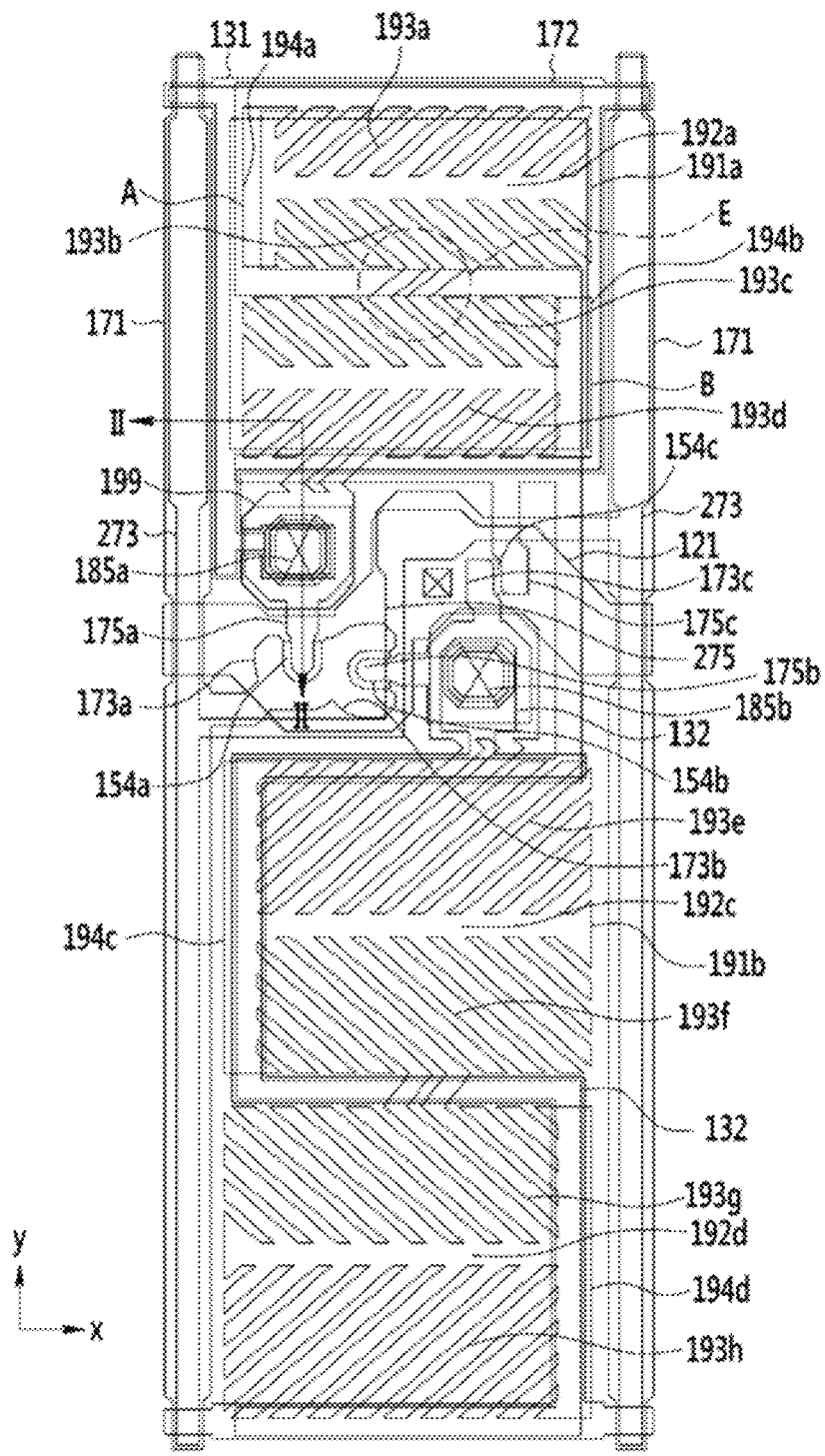
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a thin film transistor and a liquid crystal display according to an exemplary embodiment of the present invention will be described with reference to the accompanying drawings.

First, a liquid crystal display according to an exemplary embodiment of the present invention will be described with reference to FIG. 1 and FIG. 2.

Figure 2:
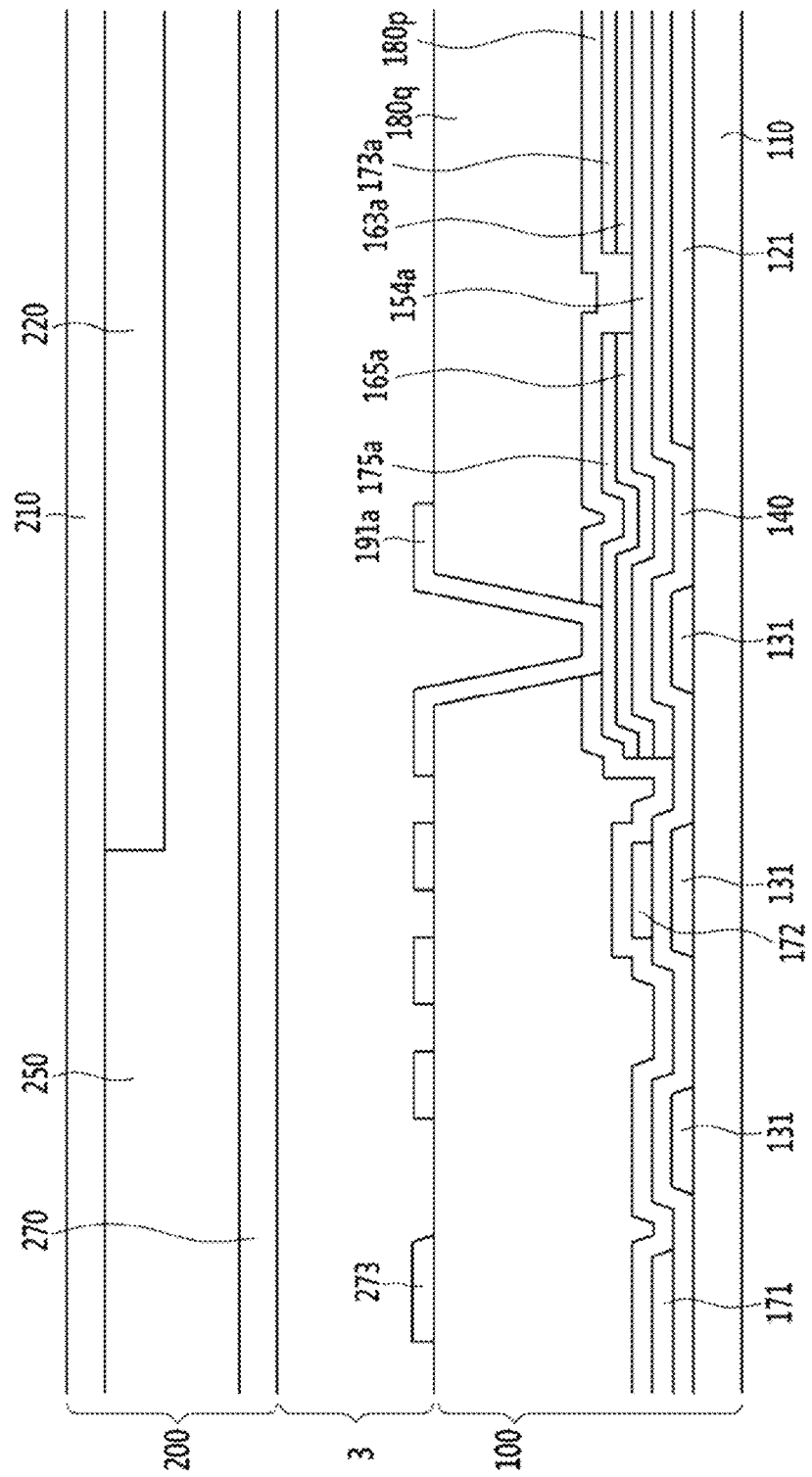
FIG. 2 is a cross-sectional view of the liquid crystal display of FIG. 1, taken along the line II-II.

FIG. 1 is a layout view of a liquid crystal display according to an exemplary embodiment of the present invention. FIG. 2 is a cross-sectional view of the liquid crystal display of FIG. 1, taken along the line II-II.

First, a first display panel 100 will be described.

A gate conductor including gate lines 121 and storage electrode lines 131 and 132 are formed on a first insulation substrate 110 made of transparent glass or plastic.

The gate line 121 include a gate electrode and a wide end portion (not illustrate) for contact with another layer or an external driving circuit. The gate line 121 may be made of an aluminum-based metal such as aluminum (Al) or an aluminum alloy, a silver-based metal such as silver (Ag) or a silver alloy, a copper-based metal, such as copper (Cu) or a copper alloy, a molybdenum-based metal such as molybdenum (Mo) or a molybdenum, alloy, chromium (Cr), tantalum (Ta), and titanium (Ti).

However, the gate line 121 may have a multilayered structure including at least two conductive layers having different physical properties.

The gate line 121 horizontally crosses one pixel area that is divided into a first subpixel area and a second subpixel area. The gate line 121 crosses between the first and second subpixel area. The first subpixel area displays a high gray and the second subpixel area displays a low gray.

The storage electrode lines 131 and 132 are made of the same material as the gate line 121, and may be simultaneously formed with the gate line 121.

The storage electrode line 131 in the upper portion of the gate line 121, as shown in FIG. 1, may have a quadrangle shape that surrounds the first subpixel area. The uppermost side of the quadrangular storage electrode line 131 may be horizontally extended from one pixel area and thus may be connected with another layer or an external driving circuit.

The lower storage electrode line 132 of the gate line 121 may be formed in a shape that is similar to the number "5" in the second subpixel area. That is, the storage electrode line 132 includes a plurality of horizontal portions, which extend in a horizontal direction, and a plurality of vertical portions, which extend in a vertical direction and connect the plurality of horizontal portions at edges thereof, and the vertical portions connect only one end of each horizontal portion. Thus, when a first horizontal portion and a second, horizontal portion are connected in the left side by the vertical portion, the second horizontal portion and a third horizontal portion are connected in the right side by the vertical portion. The lowermost third horizontal portion of the storage electrode line 132 is horizontally extended from one pixel area and thus may be connected with another layer or an external driving circuit. The third horizontal portion of the storage electrode line 132 is the same as the upper end horizontal portion of the storage electrode line 131 of another pixel area disposed therebelow. That is, a single horizontal portion is horizontally extended from one pixel area and then connected with another layer or an external driving circuit. Herein the "horizontal" refers to the direction along x-axis, and the "vertical" to the direction along y-axis, shown in FIG. 1.

A gate insulating layer 140 is formed on the gate conductor.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a data line 171 and a divided reference voltage line 172 is formed on the ohmic contacts 163a, 165a, 163b, 165b, 163c, and 165c and the gate insulating layer 140. The data conductor, the semiconductor positioned below the data conductor, and the ohmic contact may be simultaneously formed by using one mask.

A gate electrode 124, a first source electrode 173a, a first drain electrode 175a, and the first semiconductor 154a form a first thin film transistor (TFT) Qa, and a channel of the first thin film transistor Qa is formed in the semiconductor 154a between the first source electrode 173a and the first drain electrode 175a. Similarly, the gate electrode 124, a second source electrode 173b, a second drain electrode 175b, and the second semiconductor 154b form a second thin film transistor Qb, and a channel of the second thin film, transistor Qb is formed in the semiconductor 154b between a second source electrode 173b and the second drain electrode 175b. In addition, the gate electrode 124, a third source electrode 173c, a third drain electrode 175c, and the third semiconductor 154c form a third thin film transistor Qc, and a channel of the third thin film transistor Qc is formed in the semiconductor 154c between the third source electrode 173c and the third drain electrode 175c.

The second drain electrode 175b is connected with the third source electrode 173c, and includes a widely extended portion.

A first passivation layer 180p is formed on the data conductor and the exposed semiconductors 154a, 154b, and 154c. The first passivation layer 180p may include an inorganic insulating layer such as a silicon nitride or a silicon oxide. When a second passivation layer 180q is a color filter, the first passivation layer 180p may prevent a pigment of the color filter 230 from flowing into exposed portions of the semiconductors 154a, 154b, and 154c.

The second passivation layer 180q is provided on the first passivation layer 180p. The second passivation, layer 180q can be omitted, and the second passivation layer 180q may be a color filter. When the second passivation layer 180q is a color filter, the second passivation layer 180q may display one of primary colors such as three primary colors of red, green, and blue, and the primary colors may include the three primary colors of red, green, and blue, or may include yellow, cyan, and magenta. Although it not illustrated, the color filter may further include a color filter displaying a mixed color of the primary colors or white in addition to the primary colors.

A first contact bole 185a and a second contact hole 185b exposing the first drain electrode 175a and the second drain electrode 175b are formed in the first passivation layer 180p and the second passivation layer 180q.

A plurality of pixel electrodes 191 are formed on the second passivation layer 180q. Each pixel electrode 191 is divided, interposing the gate line 121 therebetween, and includes a first subpixel electrode 191a and a second subpixel electrode 191b neighboring each other in a column direction, with the gate electrode 121 therebetween. The pixel electrode 191 may be made of a transparent material such ITO and IZO. Alternatively, the pixel electrode 191 may be made of a reflective metal such as aluminum, silver, chromium, or an alloy thereof.

A shielding electrode 273 made of the same material as the pixel electrode 191 may be formed in the same layer as the pixel electrode 191 on the second passivation layer 180q. The pixel electrode 191 and the shielding electrode 273 may be simultaneously formed through, the same process.

First, the shielding electrode 273 will be described. The shielding electrode 273 is formed of a vertical portion overlapping an edge of the data line 171 of one pixel area and one or more horizontal portions 275 connecting neighboring vertical portions. The horizontal portion of the shielding electrode may have an expended portion in the middle thereof.

A voltage applied to a common electrode (not shown) is applied to the shielding electrode 273. Thus, an electric field is not generated between the shielding electrode 273 and the common electrode such, that a liquid crystal layer formed therebetween is not aligned. Accordingly, a liquid crystal between the shielding electrode and the common electrode displays black. As such, in the case where the liquid crystal displays black, the liquid crystal itself may serve as a black matrix. Thus, a black matrix: typically provided in an upper panel may be omitted in a liquid crystal display including the thin film transistor array panel according to the exemplary embodiment of the present invention. That is, the liquid crystal between the shielding electrode 273 and the common electrode may serve as the black matrix.

However, such a shielding electrode 273 may be omitted.

Next, the pixel electrode 191 will be described in detail. The pixel electrode 191 is divided, and includes the first sub-pixel electrode 191a and the second subpixel electrode 191b neighboring each other in a column direction, centering the gate line 121 therebetween.

The first subpixel electrode 191a includes a first subregion A and a second subregion B. Each of the subregions A and B includes a horizontal stem extending in a horizontal direction and a plurality of minute branches extending in a diagonal direction at lateral sides of the stem portions. Two horizontal stems 192a and 192b exist in the first subpixel electrode 191a, and extending directions of minute branches of each horizontal stem are different from each other.

Referring to FIG. 1, the first horizontal stem, as described, according to the various exemplary embodiments of the present invention, the shape of minute branches of the pixel electrode is variously changed and thus visibility can be improved and a liquid crystal control force can be reinforced to thereby suppress generation of a texture.

The first subregion A includes the first horizontal stem 192a and a first vertical stem 194a that perpendicularly crosses the first horizontal stem 192a at the left side thereof, and a plurality of first minute branches 193a and a plurality of second minute branches 193b extending from the first horizontal stem 192a obliquely extend in a direction away from the first vertical stem 194a.

In this case, the plurality of first minute branches 193a extends in a right upward direction away from the first vertical stem 194a and the plurality of second minute branches 193b extends in a right downward direction away from the first vertical stem 194a.

Meanwhile, the second subregion B includes the second horizontal stem 192b and a second vertical stem 194b that is perpendicular to the second horizontal stem 192b at the right side thereof and a plurality of third minute branches 193c and a plurality of fourth minute branches 193d extending front the second horizontal stem 192b obliquely extend in a direction away from the second vertical stem 194b.

That is, the plurality of third minute branches 193c extend in a left upward direction away from the second vertical stem 194b, and the plurality of fourth minute branches 193d extend in a right downward direction away from the second vertical stem 194b.

However, the above-stated directions are exemplarily illustrated, and the first horizontal stem 192a may have the first vertical stem 194a at the right side thereof and the second horizontal stem 192b may have the second vertical stem 194b at the left side. In this case, the first minute branches 193a and the second, minute branches 193b respectively extend in left upward and left, downward directions, and the third minute branches 193c and the fourth minute branches 193d respectively extend in right upward and right downward directions.

As shown in the part "E" in FIG. 1, some of the second minute branches 193b extending in the downward direction from the first horizontal stem 192a are connected to the third minute branches 193c extending in the upward direction, from the second horizontal stem 192b. In addition, some of the fourth minute branch 193d extending from the second horizontal stem 192b are connected to an expansion portion 199 of the first subpixel electrode 191a and receive a voltage from a drain electrode through the first, contact hole 185a.

The shape of the second subpixel electrode 191b is almost the same as that of the first subpixel electrode 191a. In detail, the second subpixel electrode 191b includes a first subregion A and a second subregion B. The first region A includes a third horizontal stem 192c extending in a horizontal direction, a plurality of fifth minute branches 193e and a plurality of sixth minute branches 193f. The fifth and sixth minute branches 193e and 193f extend in an oblique direction from the horizontal stem 192c. The second subregion B includes a fourth horizontal stem 192d extending in a horizontal direction, a plurality of seventh minute branches 193g, and a plurality of eighth minute branches 193h. The seventh and eighth minute branches 193g and 193h extend in an oblique direction from the horizontal stem 192d. The reference numeral 194c refers to the third vertical stem, and the reference numeral 194d refers to the fourth vertical stem.

The third horizontal stem 192c of the second subpixel electrode 191b is similar to the first horizontal stem 192a of the first subpixel electrode 191a, and the fourth horizontal stem 192d is similar to the second, horizontal stem 192d of the first subpixel electrode 191b.

Likewise, the plurality of fifth minute branches 193e and the plurality of sixth minute branches 193f extended from the third horizontal stent 192c of the second subpixel electrode 191b are similar to the plurality of first minute branches 193a and the plurality of second minute branches 193b of the first subpixel electrode 191a.

In addition, the plurality of seventh minute branches 193g and the plurality of eighth minute branches 193h extended from the fourth horizontal stem 192d of the second subpixel electrode 191b are similar to the plurality of third minute branches 193c and the plurality of fourth minute branches 193d of the first subpixel electrode 191a.

That is, the description related to the second subpixel electrode 191b is the same as the description related to the first subpixel electrode 191a. Therefore no further description for the same contents will be provided.

However, as shown in FIG. 1, an area of the second subpixel electrode 191b may be larger than an area of the first subpixel electrode 191a. In other words, the subregion A of the second subpixel electrode 191b may be larger than the subregion A of the first subpixel electrode 191a, and the subregion B of the second subpixel electrode 191b may be larger than the subregion B of first subpixel electrode 191a.

Next, the shape of the first and second minute branches 193a and 193b extended from the first horizontal stem 192a of the first subpixel electrode 191a will be described.

Here, the first horizontal stem 192a, the first minute branches 193a, and the second minute branches 193b are exemplarily illustrated, but the following description can be equally applied to minute branches respectively extended from the second horizontal, stem 192b, the third horizontal stem 192c, and the fourth horizontal stem 192d.

Referring to FIG. 1, the plurality of first minute branches 193a and the plurality of second minute branches 193b extending from one first horizontal stem 192a are respectively obliquely extending upward and downward with respect to the first horizontal stem 192a.

In this case, the first minute branches 193a and the second minute branches 193b are alternately disposed to the first horizontal stem 192a in the display device according to the exemplary embodiment of the present invention.

That is, a branch point C of the first minute branch 193a and the first horizontal stem 192a and a branch point D of the second minute branch 193b and the first horizontal stem 192a are alternately formed.

Thus, the first minute branches 193a and the second minute branches 193b at both side of the first horizontal stem 192 are not symmetrical with each other because they are alternately disposed.

That is, cutouts between the second minute branches 193b are formed at locations where the first minute branches 193a are correspondingly formed, and cutouts of the first minute branches 193a are correspondingly formed at locations where the second minute branches 193b are formed.

When the first minute branches 193a and the second minute branches 193b are alternately formed with reference to the first horizontal stem 192a, collision of liquid crystals is reduced with reference to the first horizontal stem 192a, and accordingly time for stabilization alter collision is reduced. Therefore, the light exposure amount during exposure of the liquid crystal display can be reduced, and thus view side visibility can be improved. Such an effect will be described in detail later.

Next, a second display panel 200 will be described.

A black matrix 220 is formed on a second insulation substrate 210 made of transparent glass or plastic.

The black matrix 220 is formed to cover all of the area where the first transistor Qa, the second transistor Qb, the third transistor Qc, and the first and second contact holes 185a and 185b are disposed, and extends in a direction of the gate line 121 to overlap with a part of the data line 171. The black matrix 220 is positioned to be overlapped with at least a part of the two data lines 171 positioned at both sides of one pixel area to prevent light leakage which may occur around the data line 171 and the gate line 121, and may prevent light leakage in the region where the first transistor Qa, the second transistor Qb, and the third transistor Qc are positioned.

An overcoat 250 is formed on the black matrix 220. The overcoat 250 may be made of an (organic) insulator, and provides a flat surface. The overcoat 250 may be omitted. A common electrode 270 is formed on the overcoat.

An upper alignment layer (not illustrated) is formed on the common electrode 270. The upper alignment layer may be a vertical alignment layer.

A liquid crystal layer 3 has negative dielectric anisotropy, and liquid crystal molecules of the liquid crystal layer 3 are aligned so that long axes thereof are perpendicular to the surfaces of the two panels 100 and 200 without applying an electric field.

Next, an effect of the display device according to the exemplary embodiment of the present invention will be described, with reference to FIG. 10 to FIG. 12.

Figure 10:
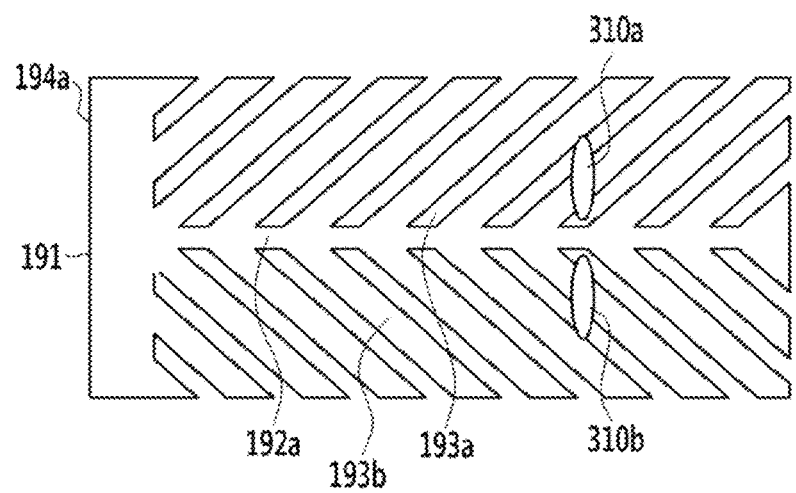
FIG. 10 exemplarily illustrates a pixel electrode according to a comparative example of the present invention.

FIG. 10 exemplarily illustrates a pixel electrode according to a comparative example of the present invention. Referring to FIG. 10, a first minute branch 193a and a second minute branch 193b are not alternately arranged in the pixel of FIG. 10.

That is, a branch point C where each, of the first minute branches 193a are branched from the first horizontal stem 192a and a branch point D where each of the second minute branches 193b are branched from the first horizontal stem 192a are located at the same position on the first horizontal stem 192a. The minute branches are symmetrical to each other with reference to the first horizontal stem 192a. That is, second minute branches 193b are symmetrically formed with reference to the first, horizontal stem 192 at a location where the first minute branches 193a are formed, and an area where a cutout of the first minute branches 193a corresponds to a cutout of the second minute branches 193b.

In a display device having such a pixel electrode, liquid crystals collide with each other near the first horizontal stem 192a as shown in FIG. 10.

Referring to FIG. 10, a first liquid crystal molecule 310a aligned by the first minute branches 193a and a second liquid crystal molecule 310b aligned by the second minute branches 193b collide with each other near the horizontal stem.

A time period taken for the liquid crystals turning back to their original places after the collision is referred to as a stabilization time, and the amount of exposure is increased during alignment of the liquid crystal display as the stabilization time is extended.

That is, after manufacturing of the liquid crystal display, a voltage is applied to each pixel electrode and a common electrode to properly lay down liquid crystals, and a pre-tilt of the liquid crystal molecules is formed through exposure at this point.

In case of the display device of FIG. 10, when a voltage is applied, liquid crystals rotate and thus collide with each other in each horizontal stem, and a stabilization time is required after such a collision, and accordingly, the amount of exposure is increased. When the exposure amount is increased, the entire luminance of the display device is increased, thereby causing deterioration of side viewing visibility. In general, side viewing visibility is decreased as luminance is increased.

However, in the display device of the exemplary embodiment of FIG. 1, the first minute branches 193a and the second minute branches 193b are alternately formed in the pixel electrode. The third minute branches 193c and the fourth minute branches 193d are likewise. In addition, the above-stated alternate alignment of the minute branches is also equally applied to the second subpixel electrode 191b. FIG. 11 illustrates only a pixel electrode of the display device according to the exemplary embodiment of FIG. 1.

Figure 11:
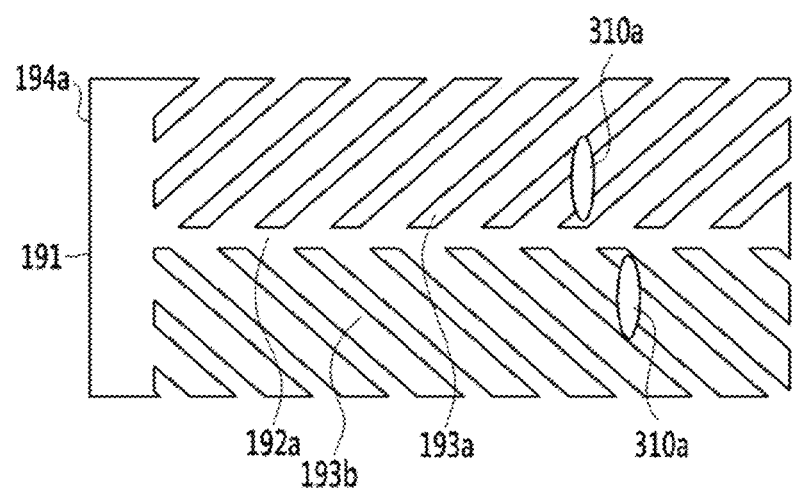
FIG. 11 illustrates only a pixel electrode of the liquid crystal display of FIG. 1.

Referring to FIG. 11, as previously described, a branch point of the plurality of first minute branches 193a and the first horizontal stem 192a and a branch point of the plurality of second minute branches 193b and the first horizontal stem 192a are alternately formed.

Thus, with reference to the first horizontal stem 192a, the first minute branches 193a and the second minute branches 193b are not symmetrical to each other.

In FIG. 11, a first liquid crystal molecule 310a rotating by the first minute branches 193a and a second liquid crystal molecule 310b rotating by the second minute branches 193b do not collide or slightly collide with each other near the first horizontal stent 192a.

As shown in FIG. 11, the liquid crystal molecules 310a and 310b do not collide with each other or slightly collide with each other because the first minute branches 193a and the second minute branches 193b respectively alternate with each other.

Thus, in case of the display device of such an exemplary embodiment of the present invention, a stabilization time is short because no collision occurs or a weak collision occurs. Accordingly, the amount of exposure can be reduced during exposure. That is, although a voltage is applied to the display device, liquid crystal molecules collide less with each other and thus a stabilization time is short, and accordingly, the amount of exposure can be reduced. When the exposure amount is reduced, the entire luminance can be decreased, and accordingly, side visibility can be improved.

Figure 12:
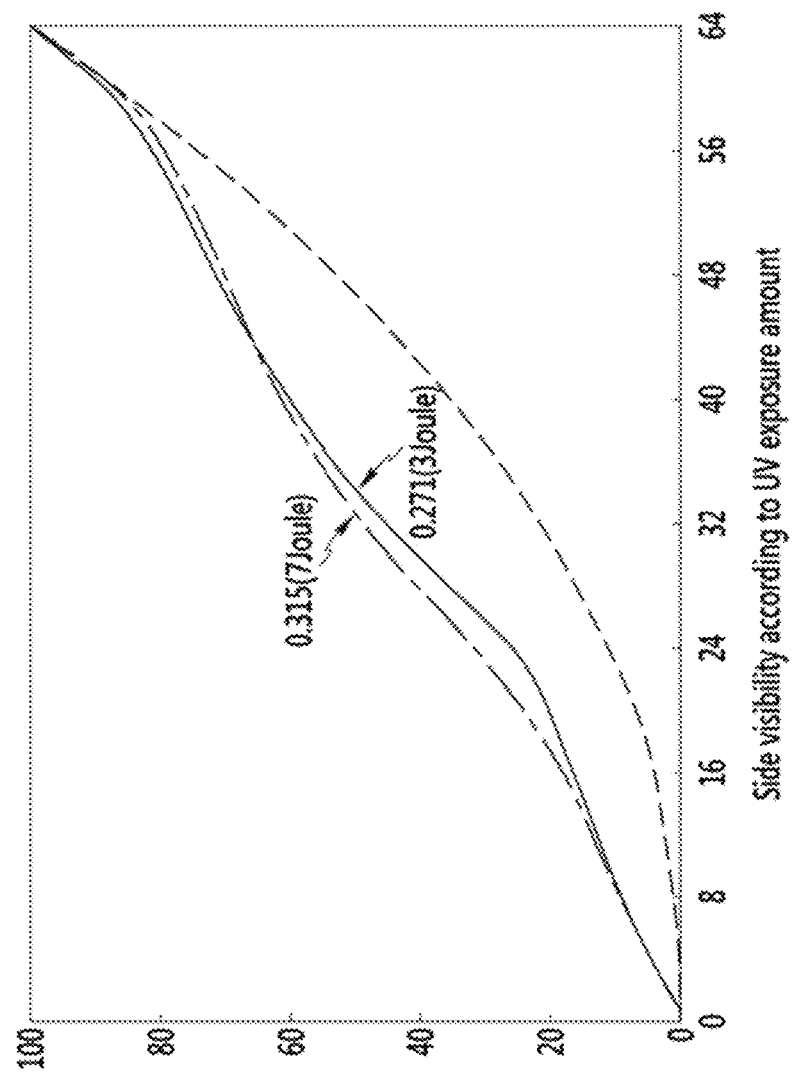
FIG. 12 is a graph illustrating side view visibility according to an exposure amount in the display devices of each of the exemplary embodiment and a comparative example of the present invention.

FIG. 12 is a graph illustrating side visibility according to the amount of exposure in the display device of the exemplary embodiment of the present invention and a display device of a comparative example of the present invention.

FIG. 12, a display device according to a comparative example of the present invention has a pixel electrode having the structure of FIG. 10, and the amount of exposure of the display device was 7 Joule. In this case, side visibility was measured to be 0.315.

However, as shown in FIG. 12, the display device of the exemplary embodiment of the present invention has a pixel electrode of the structure of FIG. 11, and the amount of exposure was 3 Joule, which was significantly low compared to the comparative example. In this case, side visibility was 0.271, and thus side visibility of the display device of the exemplary embodiment of the present invention is significantly improved compared to the comparative example.

Figure 3:
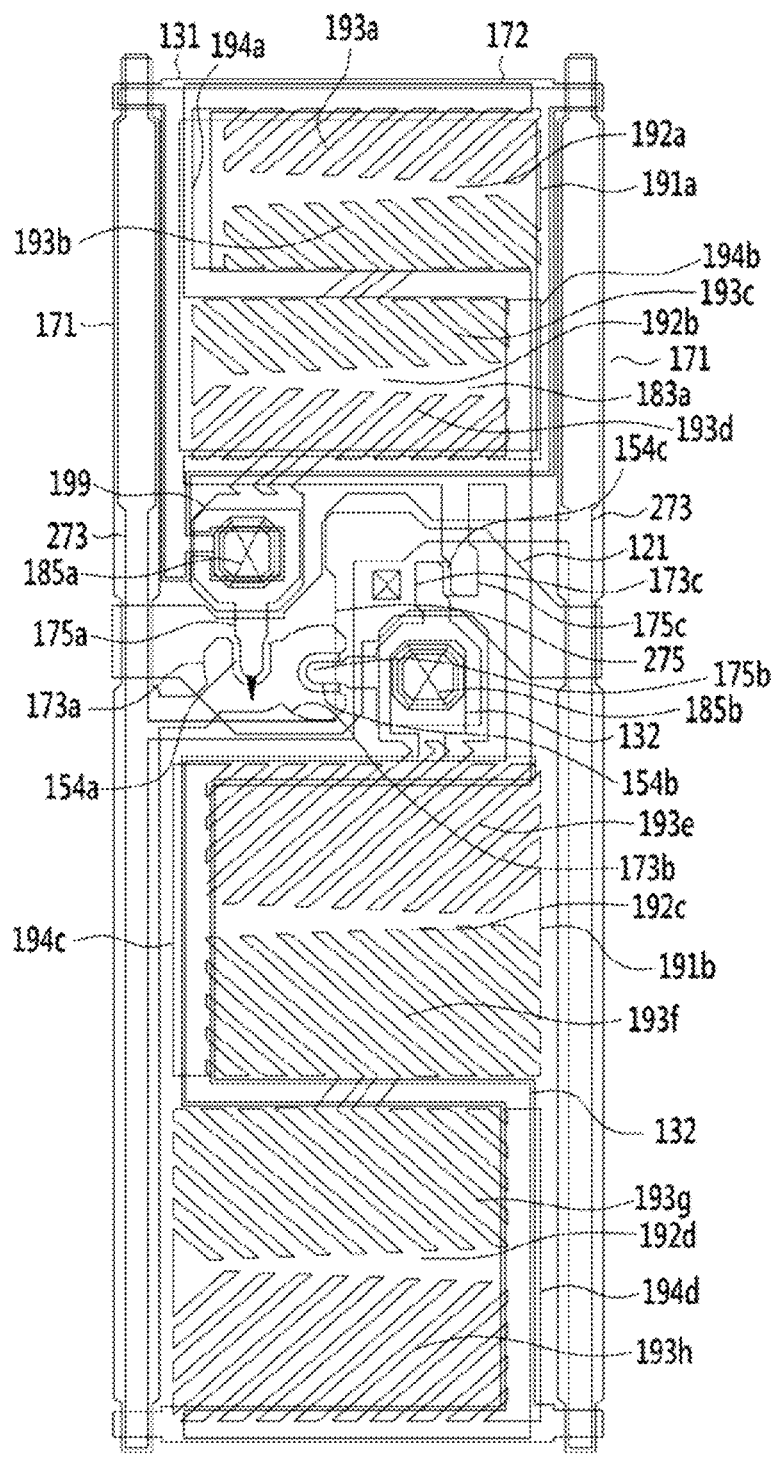
FIG. 3 is a layout view of a liquid crystal display according to the exemplary embodiment of the present invention.

Next, referring to FIG. 3 and FIG. 13, a display device according to another exemplary embodiment of the present invention will be described. Referring to FIG. 3, a liquid crystal display according to the present exemplary embodiment is almost the same as the liquid crystal display of the exemplary embodiment of FIG. 1. No further description for the similar constituent elements will be provided.

The shape of a pixel electrode 191 of the liquid crystal display according to the exemplary embodiment of FIG. 3 is different from that of FIG. 1. In detail, referring to FIG. 3 and FIG. 13, the width of a first horizontal stem 192a of a pixel electrode of the liquid crystal display according to the present exemplary embodiment is gradually decreased.

That is, the width of the first horizontal stem 192a that is adjacent to a vertical stem of one pixel electrode is wider than the width of one end of the first horizontal stem 192a.

Figure 13:
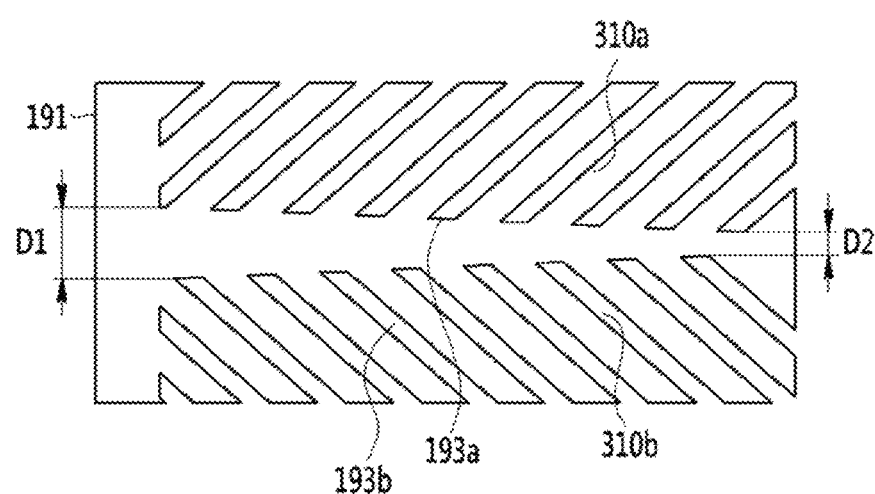
FIG. 13 illustrates only a pixel electrode of the display device of FIG. 3.

Referring to FIG. 13, a width D1 of the first horizontal stem 192a that is adjacent to a first vertical stem 194a is greater than a width D2 of one end of the first horizontal stem 192a. Thus, the first horizontal stem 192a has an inclined structure due to the gradually decreasing width.

This is also applied to other horizontal stems, that is, a second horizontal stem 192b, a third horizontal stem 192c, and a fourth horizontal stem 192d.

In case of a pixel electrode having such a structure, the length of the first minute branch 193a and the length of the second minute branch 193b are relatively increased at a side having a narrow width in the horizontal stem.

In case of the liquid crystal display device including the pixel electrode having the structure of FIG. 10, which is the comparative example of the present invention, the vertical stems exist only at both sides of the horizontal stem, and therefore, a force to hold liquid crystals is weakened in an area far away from the vertical stem. That is, liquid crystals rotate in a desired direction in an area adjacent to the vertical stem, but an insufficient electric field is applied to liquid crystals in an area that is away from the vertical stem, thereby causing a smear or a texture to be viewed.

However, in the liquid crystal display according to the exemplary embodiment of FIG. 3, the width of the first horizontal stem 192a of the pixel electrode is gradually decreased, and thus the length of the first minute branch 193a and the length of the second minute branch 193b are relatively increased. When the length of the plurality of first minute branches 193a and the length of the plurality of second minute branches 193b are increased, a stronger electric field is applied to liquid crystals, and accordingly, generation of a texture can be reduced.

In addition, as shown in FIG. 13, liquid crystals 310a and 310b aligned by the plurality of first and second minute branches 193a and 193b are alternately formed, thereby preventing occurrence of collision of the liquid crystals. This is the same as the description related to the liquid crystal display according to the exemplary embodiment of FIG. 1.

That is, the liquid crystal display according to the present exemplary embodiment can improve side visibility and also increase the length of the first and second minute branches 193a and 193b, respectively, thereby preventing generation of a texture.

Next, a liquid crystal display according to another exemplary embodiment of the present invention will be described with reference to FIG. 4 to FIG. 14 and FIG. 19.

Figure 4:
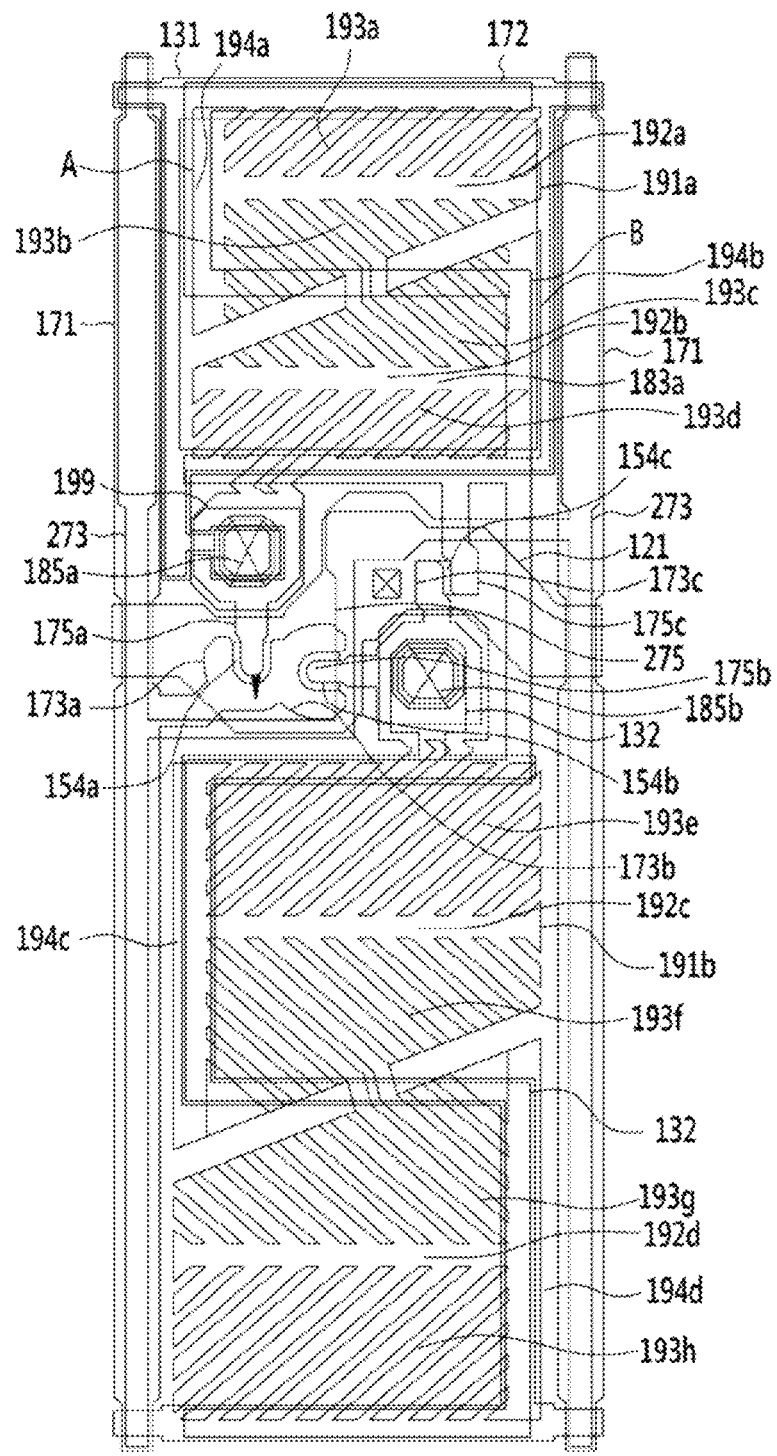
FIG. 4 is a layout view of a liquid crystal display according to another exemplary embodiment of the present invention.

FIG. 4 is a layout view of a liquid crystal display according to another exemplary embodiment of the present invention. Referring to FIG. 4, a liquid crystal display of the present exemplary embodiment is almost the same as the display device according to the exemplary embodiment of FIG. 1. No further description for the similar constituent elements will be provided.

The shape of a pixel electrode 191 of the liquid crystal display according to the exemplary embodiment of FIG. 4 is different from that of FIG. 1. Referring to FIG. 4, an interface of two pixel electrode subregions A and B is a first subpixel electrode 191a and a second subpixel electrode 191b in the liquid crystal display according to the present exemplary embodiment is oblique.

That is, as shown in FIG. 4, each of the subpixel electrodes 191a and 191b is formed of two subregions. In FIG. 4, subregions existing in the first subpixel electrode 191a are sequentially called a first subregion A and a second subregion B. This is also equally applied, to other drawings.

In this case, an interface of the first subregion A and the second subregion B of the display device according to the exemplary embodiment of FIG. 4 is oblique.

That is, referring to FIG. 4, the length of a plurality of first minute branches 193a and the length of a plurality of second minute branches 193b are different from each other on the basis of the first horizontal stem 192a. Herein, the length of the minute branch, is a distance of the minute branch from the point connected to the horizontal stem to the end of the branch that is farthest away from the horizontal stem.

The length of the each of the first minute branches 193a is equal to one another, but the second minute branches 193b have different lengths. A branch electrode, which is located closest to the first vertical, stem 194a among the plurality of second minute branches 193b, has the longest length, and the length of the branch electrode is shortened as proceeding farther away from the first vertical stem 194a.

On the contrary, a branch electrode of the plurality of third minute branches 193c, which is located closest to the second vertical stem 194b, has the longest length, and the length of the branch electrode is gradually shortened as proceeding farther away from the second vertical stem 194b. The plurality of fourth minute branches 193d have the same lengths. In other words, the length of the plurality of minute branches 193b extending in a first direction from the horizontal stem of the first subregion A becomes the longest near the vertical stem 194a of the first subregion and is shortened as proceeding away from the vertical stem. The length of the plurality of minute branches 193c extending in a second direction from the horizontal stem of the second subregion B becomes the longest near the vertical stem 194b of the second subregion and is shortened as proceeding away from the vertical stem. The first direction may be an opposite direction of the second direction.

In case of the pixel electrode having such a structure, generation of texture in the pixel electrode can be effectively reduced. Such an effect will be described in detail with reference to FIG. 14 to FIG. 19.

Figure 14:
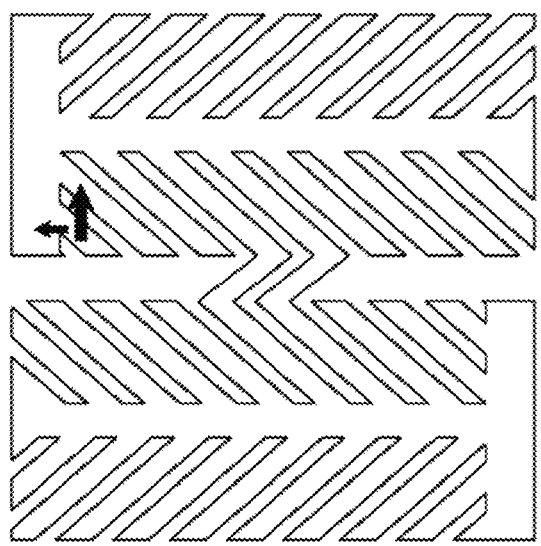
FIG. 14 illustrates only a pixel electrode of a display device of a comparative example of the present invention.
Figure 15:
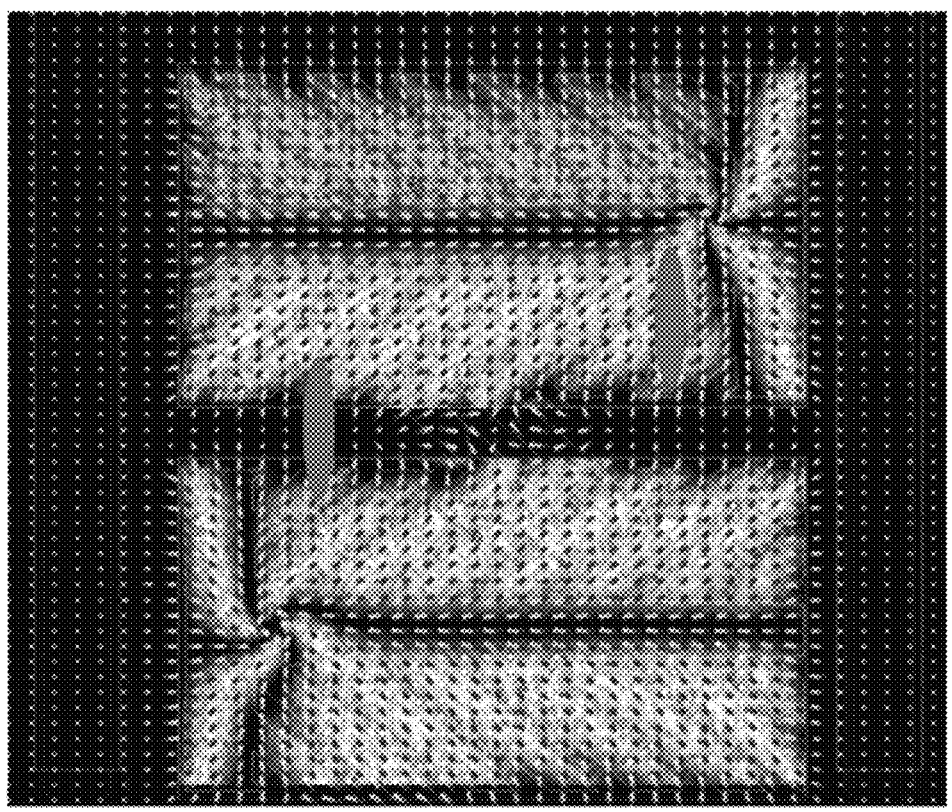
FIG. 15 illustrates alignment of liquid crystal in the pixel electrode of the display according to the comparative example of the present invention.
Figure 16:
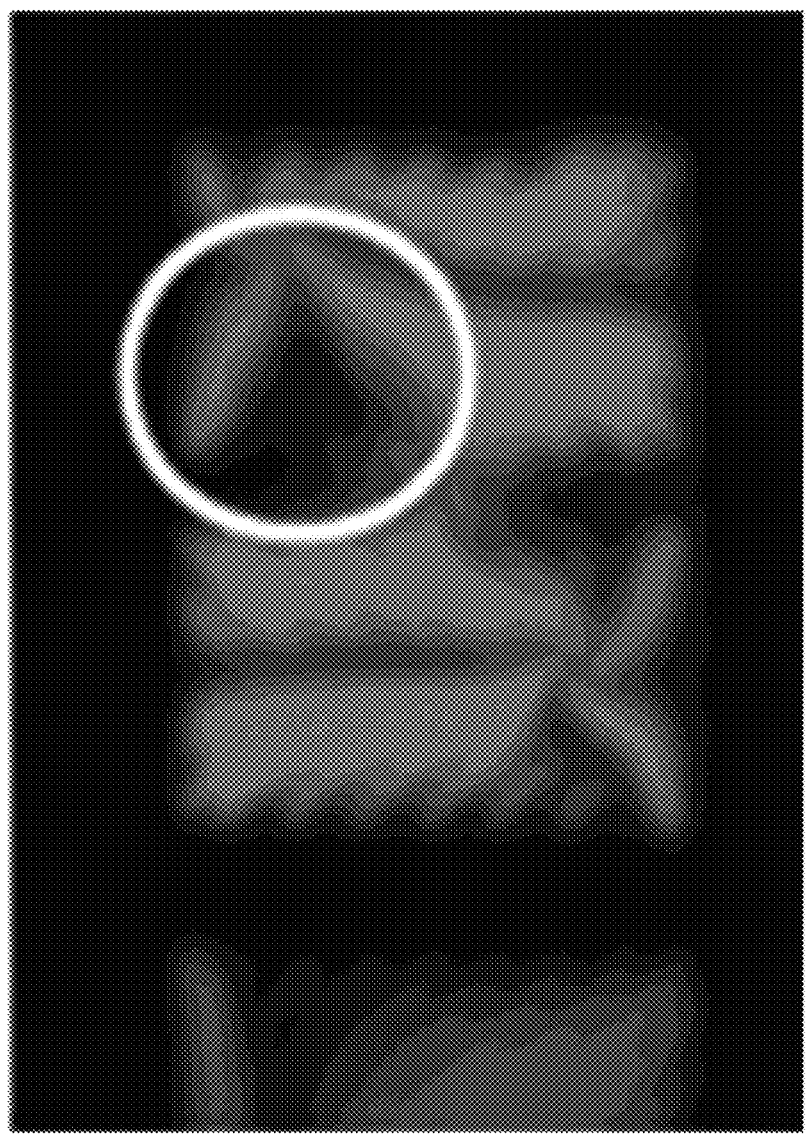
FIG. 16 illustrates an image where a texture is generated in the pixel electrode of the display device of the comparative example of the present invention.
Figure 17:
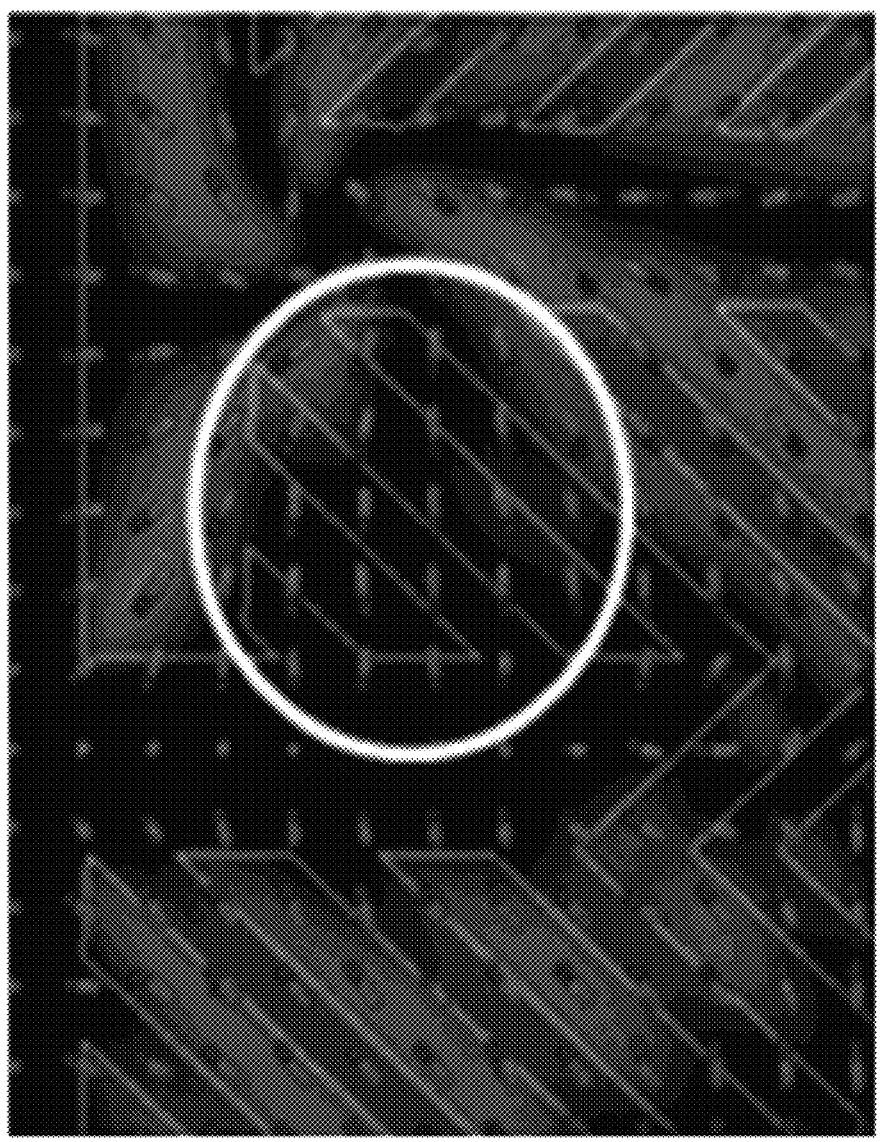
FIG. 17 illustrates liquid crystal alignment of the display device according to the comparative example of the present invention.

FIG. 14 illustrates the pixel electrode of the display device according to the comparative example of the present invention. FIG. 15 illustrates alignment of liquid crystals in the pixel electrode of the display device according to the comparative example of the present invention. FIG. 16 illustrates an image where a texture is generated in the pixel electrode of the display device of the comparative example of the present invention. FIG. 17 illustrates liquid crystal alignment of the display device according to the comparative example of the present invention.

In FIG. 14, the arrow indicates a force applied to the liquid crystal. Referring to FIG. 14, a vertical directional force is stronger because of the vertical stem near the vertical stem. That is, as marked by the large arrow in FIG. 14, a vertical direction force is applied by the vertical stem, and as marked by the small arrow in FIG. 14, a horizontal directional force applied by minute branches is weak.

Thus, liquid crystals in this area are aligned in the vertical direction as shown in FIG. 15 rather than being in a direction of the minute branches. In FIG. 15, it can be observed that the liquid crystals are aligned in the vertical direction near the vertical stem.

Due to such a liquid crystal alignment, a texture is generated in the area as shown in FIG. 16. Referring to FIG. 16, it can be observed that the texture is generated in an area adjacent to the vertical stem.

FIG. 17 is an enlarged view of alignment of liquid crystal molecules in the area where the texture is generated in FIG. 16. Referring to FIG. 17, it is observed that liquid crystal molecules in an area corresponding to the area where the texture is generated in FIG. 16 are not aligned in the same direction as the minute branches but are aligned in a vertical direction.

As described, in case of the liquid crystal display according to the comparative example of the present invention, liquid crystal molecules in an area near the vertical stem of the pixel electrode are aligned in a vertical direction due to a strong vertical directional electric field, and accordingly, a texture is viewed.

However, in the display device according to the exemplary embodiment of the present invention, the length of the minute branches near the vertical stem is extended to increase a horizontal directional electric field by the minute branches, and accordingly the liquid crystal molecules are aligned in the same direction as the minute branches rather than in a vertical direction.

Figure 18:
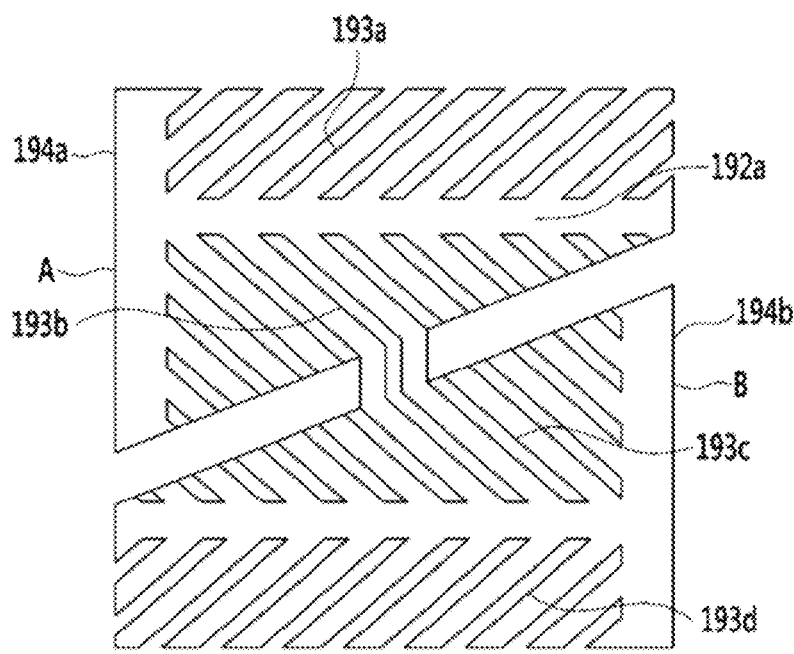
FIG. 18 illustrates a pixel electrode of a pixel electrode of the liquid crystal display according to the exemplary embodiment of FIG. 4.

FIG. 18 shows the pixel electrode of the liquid crystal display according to the exemplary embodiment of the present invention. A description of the pixel electrode is the same as the previous description. That is, two pixel electrodes are obliquely partitioned, and the length of the plurality of second minute branches 193b of the first vertical stem 194a is long. Likely, the length of the plurality of third minute branches 193c of the second vertical stem 194b is long. Thus, a horizontal electric field can be sufficiently applied to the liquid crystal molecules by the long minute branches.

Figure 19:
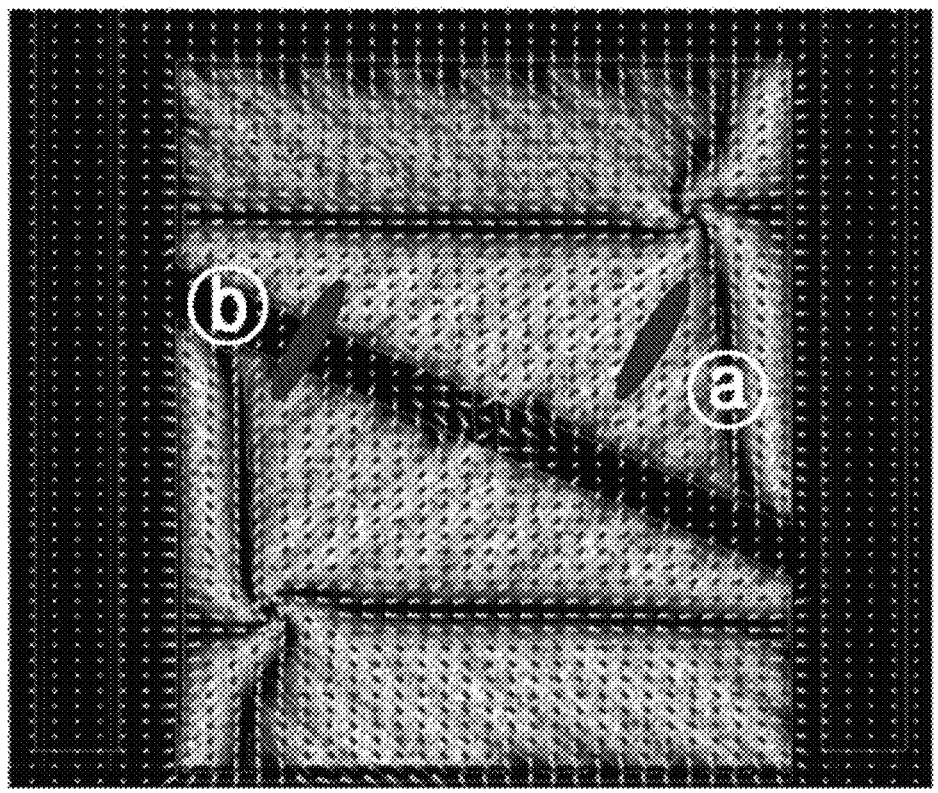
FIG. 19 illustrates liquid crystal alignment in the liquid crystal display according to the exemplary embodiment of FIG. 4.

FIG. 19 illustrates a liquid crystal alignment in the liquid crystal display according to the exemplary embodiment of the present invention. Referring to FIG. 19, it can be observed that, liquid crystal molecules in an area near the vertical stem are aligned in the same direction as the minute branches, unlike the liquid crystal molecules in the comparative example of the present invention. That is, unlike the display device of the comparative example of the present invention, the liquid crystal molecules are aligned in a diagonal direction like the alignment of the minute branches rather than being aligned in a vertical direction, and accordingly no texture is generated.

Figure 5:
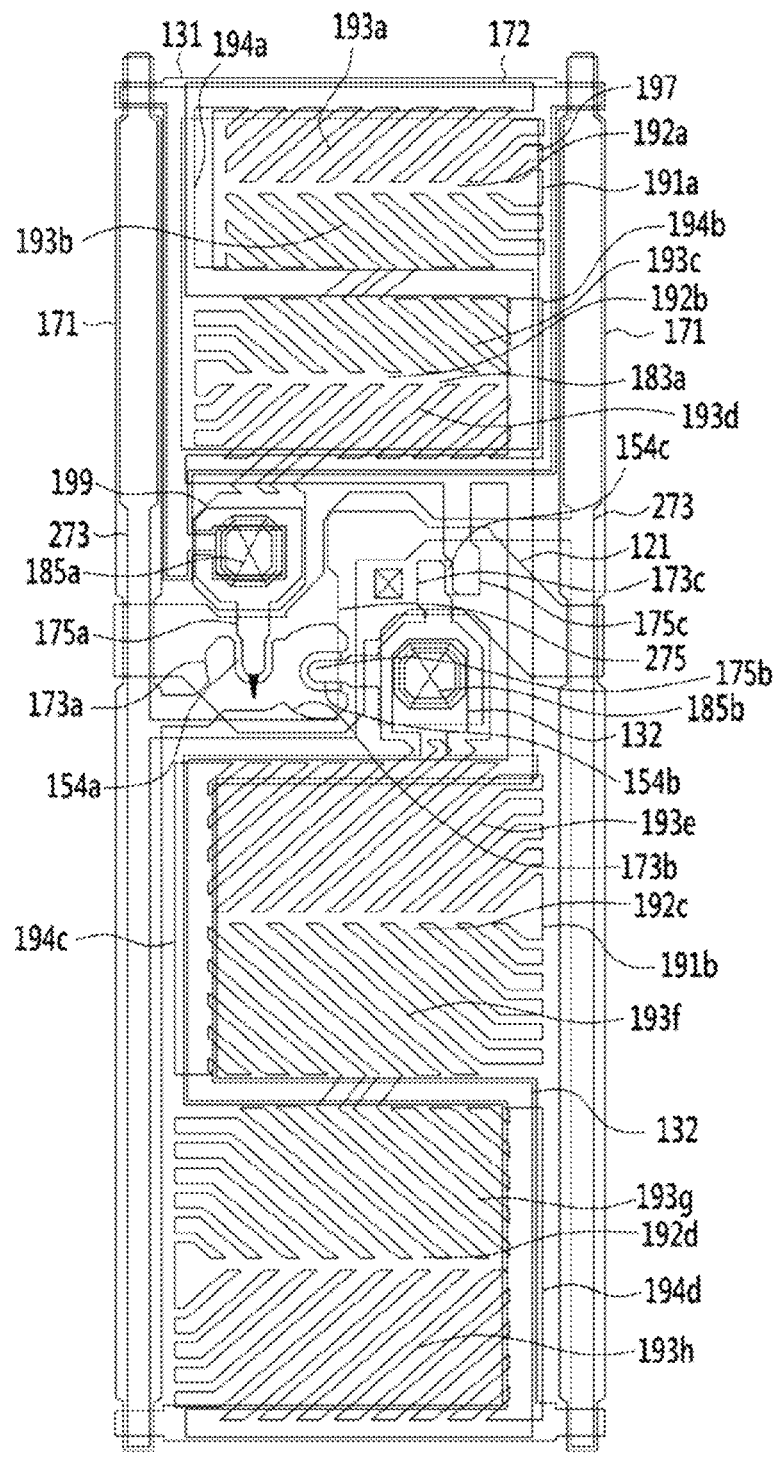
FIG. 5 and FIG. 6 are layout views of a liquid crystal display according to another exemplary embodiment of the present invention.
Figure 6:
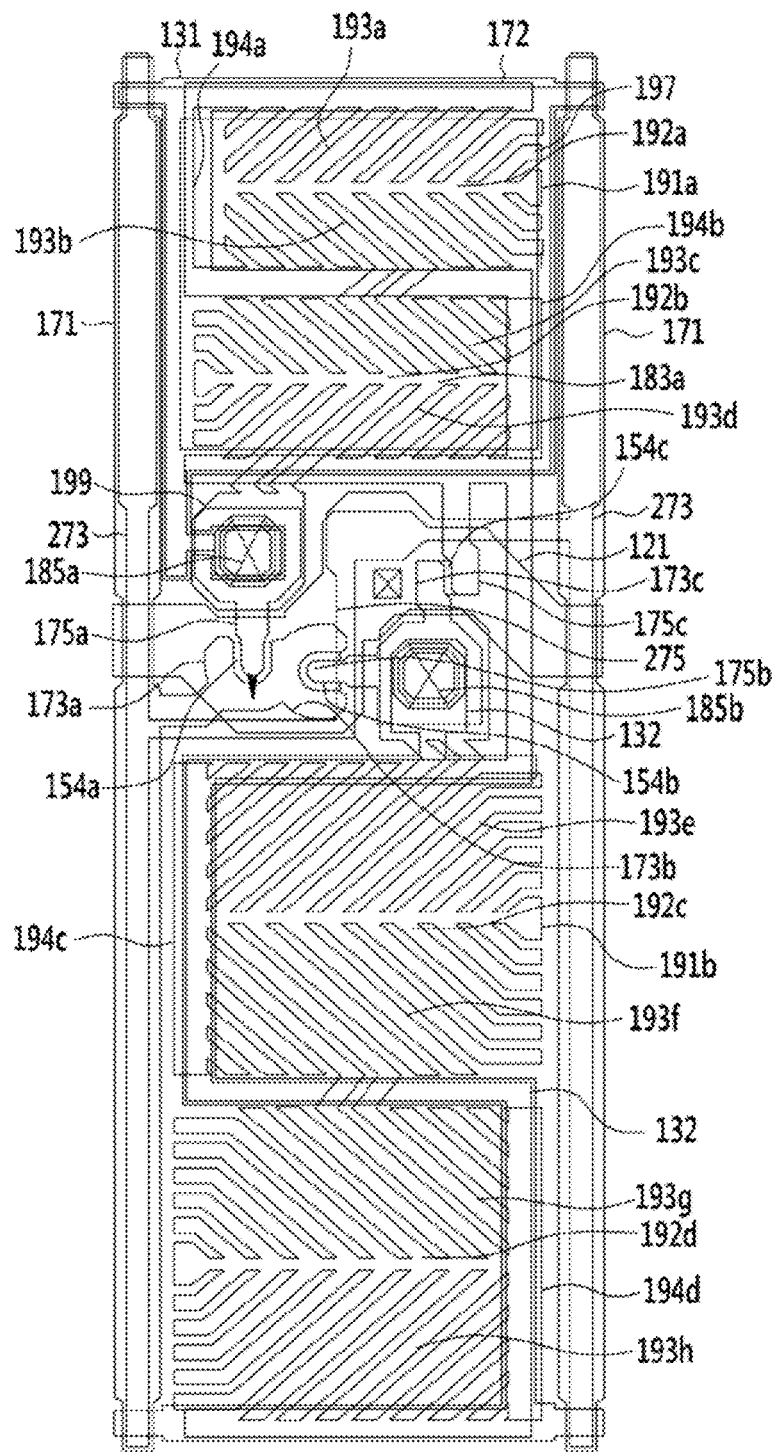

Next, a display device according to another exemplary embodiment of the present invention will be described with reference to FIG. 5 to FIG. 7 and FIG. 20. Display devices shown in FIG. 5 and FIG. 6 are similar to the display device according to the exemplary embodiment of the present invention of FIG. 1. No further description for the similar constituent elements will be provided.

However, referring to FIG. 5, in a display device according to the present exemplary embodiment, an end 197 of each of minute branches of a pixel electrode is bent in the same direction as a first horizontal stem 192a. That is, an inclination of the end 197 of the horizontal minute branch is extending with an angle that is different from other portions of a plurality of first minute branches 193a and a plurality of second minute branches 193b.

The display device shown in FIG. 3 has a structure in which minute branches of the pixel electrode are alternately disposed and an end of each of the minute branches is bent, and the display device shown in FIG. 6 has a structure in which minute branches of a pixel electrode are not alternately disposed and an end of each of the minute branches is bent.

Figure 7:
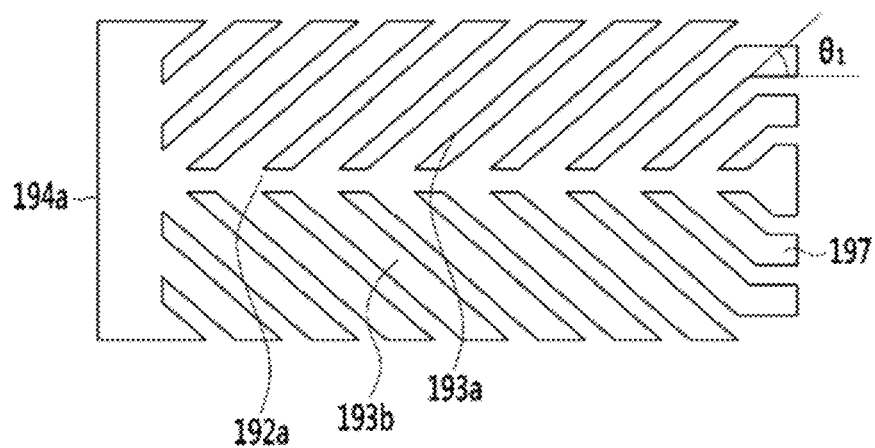
FIG. 7 shows only a pixel electrode of the liquid crystal display of FIG. 6.

In this case, the end may be bent with an angle of about 0 degree to 45 degrees with respect to the original extension direction of the minute branch. Referring to FIG. 7, an angle between the extension direction of the first minute branch 193a and the end 197 is denoted as θ1. The angle θ1 may be between 0 degree and 45 degrees. FIG. 7 illustrates that the angle θ1 is 45 degrees.

In the display device having the pixel electrode structure according to the present exemplary embodiment, a liquid crystal, control force in a horizontal direction is increased in the end 197 of the pixel electrode.

Figure 20:
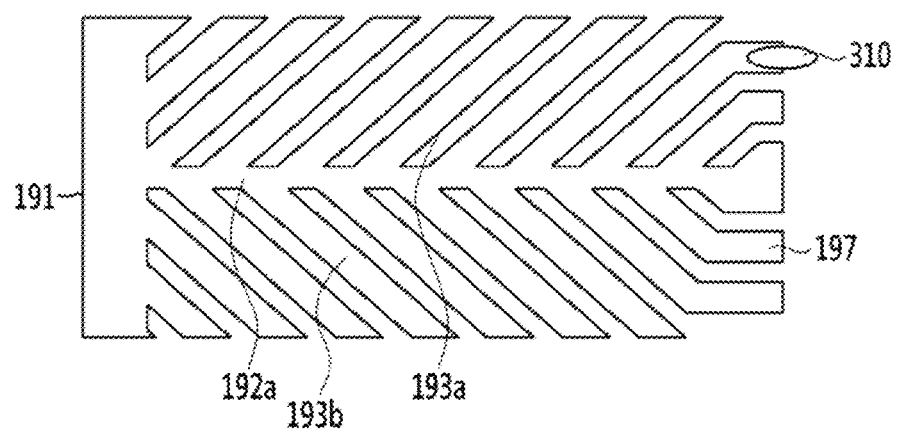
FIG. 20 illustrates an increase in a horizontal direction control force of liquid crystal molecules in the pixel electrode according to the exemplary embodiment of the present invention.

FIG. 20 illustrates an increase of a horizontal direction control force of a liquid crystal molecule 310 in a pixel electrode according to an exemplary embodiment of the present invention. That is, in case of the display device according to the present exemplary embodiment, a bent structure is formed at an end 197 of a pixel electrode to reinforce a horizontal direction control force with respect to the liquid crystal molecule 310. In the minute branches 193a and 193b that are located farther away from the first vertical stem 194a of the pixel electrode, a liquid crystal control force is weak and thus liquid crystals are aligned in a direction that is different from liquid crystals at a peripheral area thereof and thus viewed as a texture. However, in case of the display device of the present, exemplary embodiment, the end of each of the minute branches of the pixel electrode such that a control force for liquid crystal molecules can be reinforced. Accordingly, generation of a texture can be suppressed.

Next, liquid crystal displays according to another exemplary embodiment of the present invention will be described with reference to FIG. 8 and FIG. 9 to FIG. 21.

Figure 8:
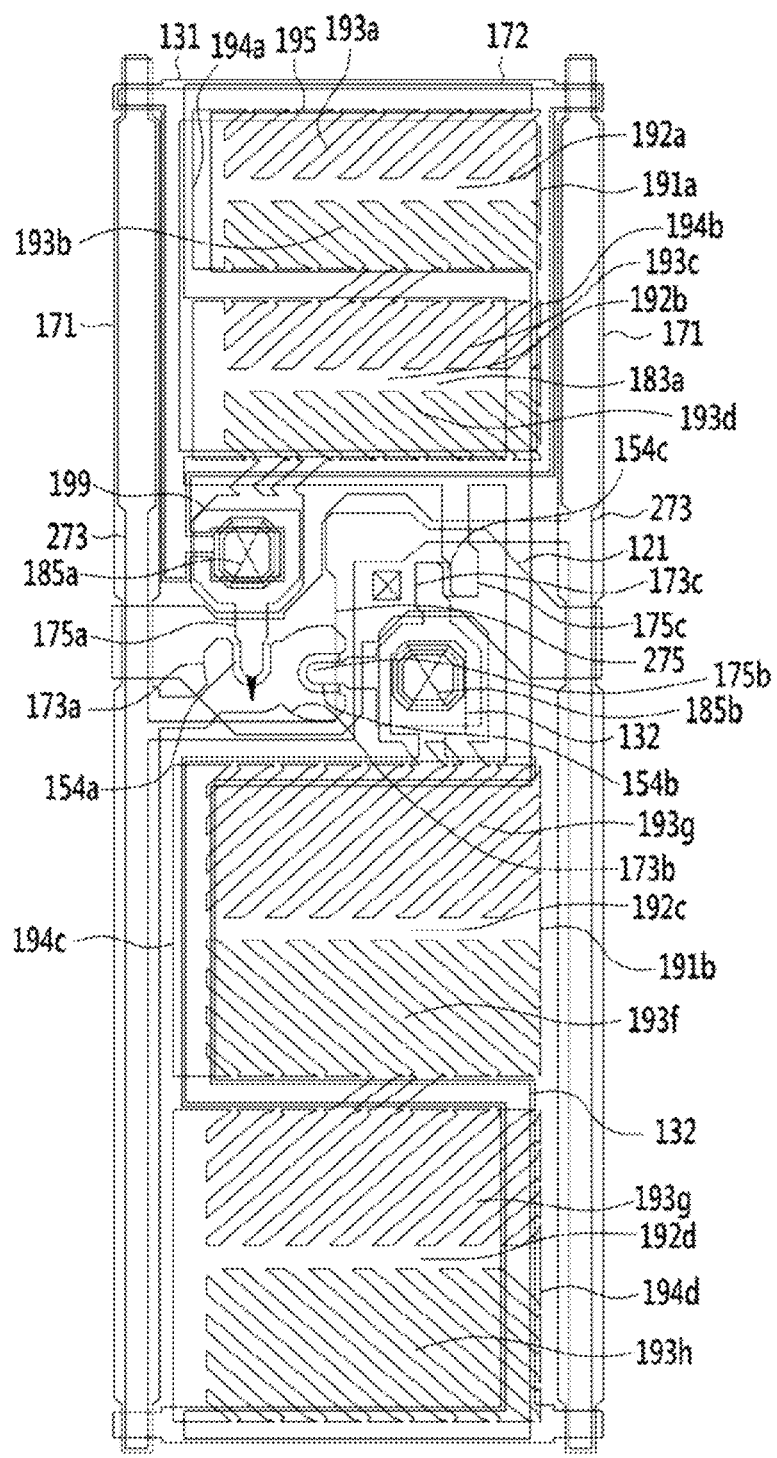
FIG. 8 and FIG. 9 are layout views of a liquid crystal display according to another exemplary embodiment of the present invention.
Figure 9:
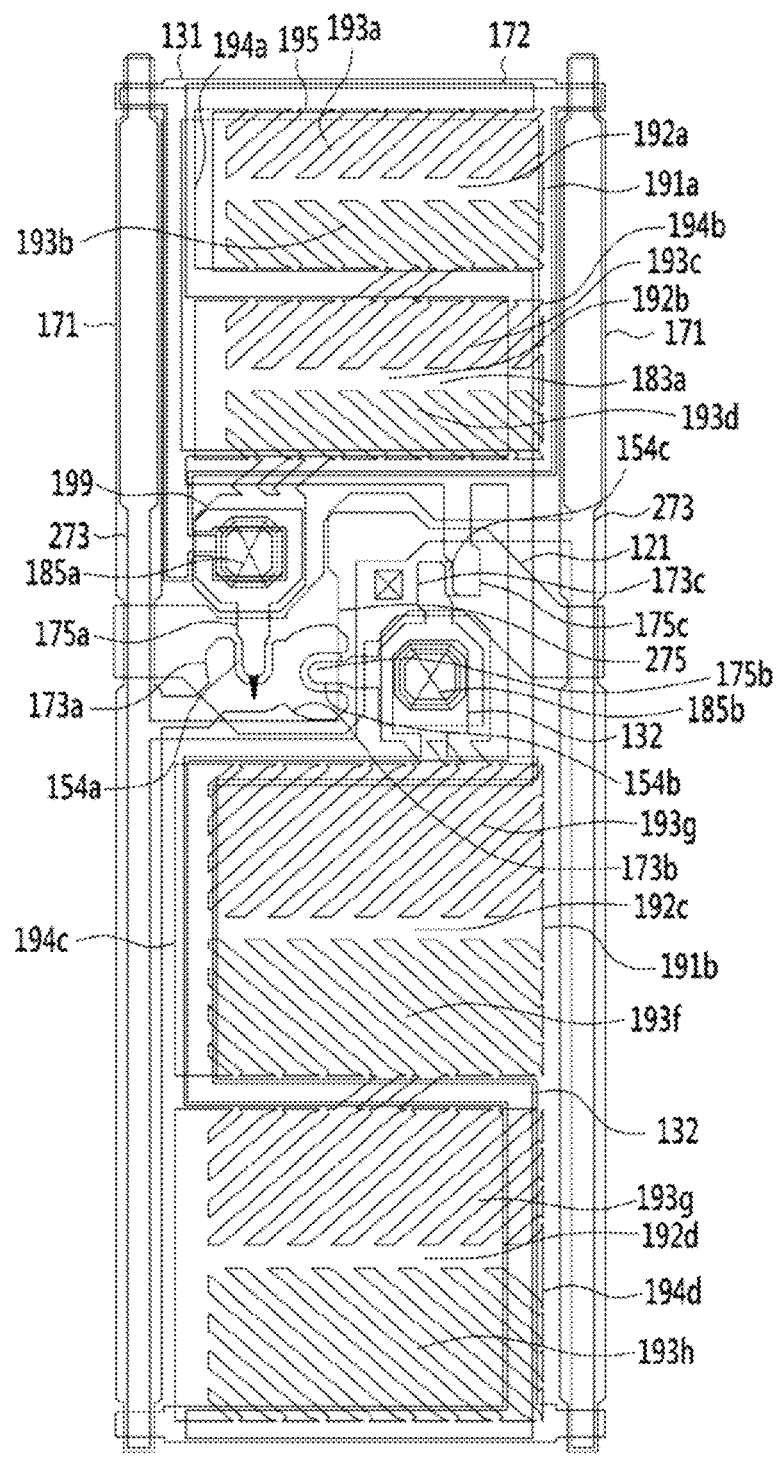

Liquid crystal displays according to exemplary embodiments of FIG. 8 and FIG. 9 are similar to the liquid crystal display according to the exemplary embodiment of FIG. 1 in most constituent elements. No further description for the similar constituent elements will be provided.

However, a protrusion structure 195 is formed in an end of each of a plurality of minute branches 193a, 193b, 193c, . . . , 193h of a pixel electrode of the liquid crystal display according to the present exemplary embodiment. That is, as shown in FIG. 8, a triangular-shaped protrusion structure 195 is formed in the end of each of the plurality of minute branches 193a, 193b, 193c, . . . , 193h of the pixel electrode. In FIG. 8, the protrusion structure is formed at both sides of each minute branch, but the protrusion structure may be formed at only one side of each minute branch.

In addition, the protrusion structure has a triangular shape in FIG. 8, but the protrusion structure may have a quadrangular shape or other shapes.

The display device shown in FIG. 8 includes a pixel electrode 191 where the first minute branch 193a and the second minute branch 193b are alternately formed.

On the other hand, the display device of FIG. 9 is similar to the display device of FIG. 8 in that a protrusion 195 is formed at an end of each of a first minute branch 193a and a second minute branch 193b of a pixel electrode 191, but the minute branches 193a and 193b are not alternately formed in the display device of FIG. 9.

That is, in the display device according to the exemplary embodiment of FIG. 9, pixel electrodes at both sides with reference to a first horizontal stem 192a and a second horizontal stem 192b are symmetrical to each other. The display device according to the exemplary embodiment of FIG. 9 has an effect of the display device according to the exemplary embodiment of FIG. 8, and also has an effect of the display device having an alternate structure of FIG. 1.

In the display devices of FIG. 8 and FIG. 9, the protrusion 195 is formed at the end of each of the first and second minute branches 193a and 193b such that a liquid crystal control force at tire end of the pixel electrode can be reinforced. Such a protrusion structure may be formed in ail the plurality of minute branches 193a, 193b, 193c, . . . , and 193h.

Figure 21:
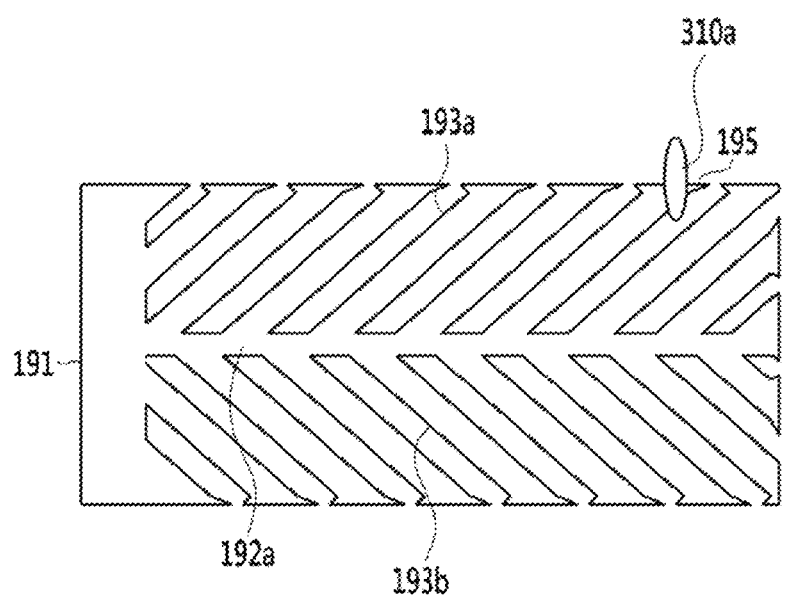
FIG. 21 illustrates a liquid crystal control force that is improved by forming a protrusion structure in the liquid crystal displays according to the exemplary embodiments of FIG. 8 and FIG. 9.

FIG. 21 illustrates a liquid crystal control force according to formation of a protrusion structure 195 in the liquid crystal display according to the exemplary embodiment of FIG. 8 and FIG. 9. The amount of the electric field applied to liquid crystals is relatively reduced at an end of each minute branch of the pixel electrode, and thus a control force with respect to the liquid crystals is weakened such that a texture is viewed. However, in the liquid crystal displays according to the exemplary embodiments of FIG. 8 and FIG. 9, the protrusion structure 195 is formed at the end of each minute branch of the pixel electrode so that the liquid crystal control force can be reinforced. Accordingly, generation of a texture at edges of the pixel electrode can be suppressed.

As described, according to the various exemplary embodiments of the present invention, the shape of minute branches of the pixel electrode is variously changed and thus visibility can be improved and a liquid crystal control force can be reinforced to thereby suppress generation of a texture.

While this invention has been described in connection with what is presently considered to be practical exemplary embodiments, it is to be understood that the invention is not limited to the disclosed embodiments, but, on tire contrary, is intended to cover various modifications and equivalent arrangements included within the spirit and scope of the appended claims.

What is claimed is:

1. A liquid crystal display comprising:
a first substrate;
a gate line formed on the first substrate;
an insulating layer formed on the gate line; and
a first subpixel electrode and a second subpixel electrode that are formed on the insulating layer, each of the first subpixel electrode and the second subpixel electrode including a first subregion and a second subregion, each of the first subregion and the second subregion comprise a vertical stem, a horizontal stem extending from a middle of the vertical stem, and a plurality of minute branches laterally extending in a diagonal direction from the horizontal stem, the plurality of minute branches being alternately branched with reference to the horizontal stem,
wherein the first subregion and the second subregion are aligned in a direction parallel to the vertical stems of the first and the second subregions, and
wherein the vertical stem of the first subregion and the vertical stem of the second subregion are formed on opposite edges of the first subpixel electrode and the second subpixel electrode in the horizontal direction.

2. The liquid crystal display of claim 1, wherein the width of one end of the horizontal stem that is adjacent to the vertical stem of the pixel electrode is wider than the width of the opposite end of the horizontal stem, which is not adjacent to the vertical stem.

3. The liquid crystal display of claim 1, wherein the width of the horizontal stem is gradually decreased farther away from the vertical stem and thus has an oblique inclination.

4. The liquid crystal display of claim 1, wherein an interface of the first subregion and the second subregion is obliquely formed.

5. The liquid crystal display of claim 4, wherein the length of the plurality of minute branches extending in a first direction from the horizontal stem of the first subregion becomes the longest near the vertical stem of the first subregion and is shortened as proceeding away from the vertical stem.

6. The liquid crystal display of claim 5, wherein the length of the plurality of minute branches extending in a second direction from the horizontal stem of the second subregion becomes the longest near the vertical stem of the second subregion and is shortened as proceeding away from the vertical stem.

7. A liquid crystal display comprising:
a first substrate;
a gate line formed on the first substrate;
an insulating layer formed on the gate line; and
a first subpixel electrode and a second subpixel electrode, each of the first subpixel electrode and the second subpixel electrode comprising a first subregion and a second subregion, each of the first subregion and the second subregion comprises a vertical stem, a horizontal stem extending from a middle of the vertical stem, and a plurality of minute branches laterally extending in a diagonal direction from the horizontal stem, a minute branch of the plurality of minute branches, which is the farthest from the vertical stem, being bent in a direction of the horizontal stem while forming a constant angle, wherein the first subregion and the second subregion are aligned in a direction parallel to the vertical stems of the first and second subregions, and wherein the vertical stem of the first subregion and the vertical stem of the second subregion are formed on opposite edges of the first subpixel electrode and the second subpixel electrode in the horizontal direction.

8. The liquid crystal display of claim 7, wherein the constant angle implies an angle between an extension direction of the plurality of minute branches and the bent minute branch, and the angle is between 0 degree to 45 degrees.

9. The liquid crystal display of claim 7, wherein a structure in which a minute branch is bent with a constant angle exists in one or more regions of the first subregion and the second subregion in the second subpixel area.

10. The liquid crystal display of claim 7, wherein the minute branches laterally extending from the horizontal stem are alternately branched with reference to the horizontal stem.

11. The liquid crystal display of claim 7, wherein a branch point of each of the minute branches laterally extending from the horizontal stem is formed in the same location.

12. A liquid crystal display comprising:
a first substrate;
a gate line formed on the first substrate;
an insulating layer formed on the gate line; and
a first subpixel electrode and a second subpixel electrode formed on the insulating layer, each of the first subpixel electrode and the second subpixel electrode comprising a first subregion and a second subregion, each of the first subregion and the second subregion comprises a vertical stem, a horizontal stem extending from a middle of the vertical stem, and a plurality of minute branches laterally extending in a diagonal direction from the horizontal stem, a protrusion structure formed at an end of each of the plurality of minute branches, wherein the first subregion and the second subregion are aligned in a direction parallel to the vertical stems of the first and second subregions, and wherein the vertical stem of the first subregion and the vertical stem of the second subregion are formed on opposite edges of the first subpixel electrode and the second subpixel electrode in the horizontal direction.

13. The liquid crystal display of claim 12, wherein the protrusion structure is formed in the shape of a triangle.

14. The liquid crystal display of claim 12, wherein the minute branches laterally extending from the horizontal stem are alternately branched with reference to the horizontal stem.

15. The liquid crystal display of claim 12, wherein a branch point of each of the minute branches laterally extending from the horizontal stem is formed in the same location.

16. The liquid crystal display of claim 12, wherein a vertical stem of the first subregion and a vertical stem of the second subregion of the first subpixel electrode are respectively formed at left and right edges in one pixel, and a vertical stem of the first subregion and a vertical stem of the second subregion of the second subpixel electrode are respectively formed at left and right edges in one pixel.

17. The liquid crystal display of claim 1, wherein the liquid crystal display is a curved-type liquid crystal display.

18. The liquid crystal display of claim 7, wherein the liquid crystal display is a curved-type liquid crystal display.

* * * * *